United States Patent
Eckel et al.

(10) Patent No.: US 11,287,334 B1
(45) Date of Patent: Mar. 29, 2022

(54) OPTOMECHANICAL PRESSURE MEASUREMENT SYSTEM AND METHOD USING THE VIBRATIONAL MODES OF A MEMBRANE

(71) Applicants: UNIVERSITY OF MARYLAND, COLLEGE PARK, College Park, MD (US); NATIONAL INSTITUTE OF STANDARDS AND TECHNOLOGY, Gaithersburg, MD (US)

(72) Inventors: Stephen Eckel, Rockville, MD (US); James Fedchak, Washington, DC (US); Thomas Purdy, Gaithersburg, MD (US); Robinjeet Singh, Gaithersburg, MD (US)

(73) Assignees: University of Maryland, College Park, College Park, MD (US); Government of the USA, as represented by the Secretary of Commerce, National Institute of Standards and Technology, Gaithersburg, MD (US)

( * ) Notice: Subject to any disclaimer, the term of this patent is extended or adjusted under 35 U.S.C. 154(b) by 160 days.

(21) Appl. No.: 16/445,583

(22) Filed: Jun. 19, 2019

Related U.S. Application Data

(60) Provisional application No. 62/686,789, filed on Jun. 19, 2018.

(51) Int. Cl.
*G01L 1/10* (2006.01)
*G01L 27/00* (2006.01)

(52) U.S. Cl.
CPC .............. *G01L 1/103* (2013.01); *G01L 1/106* (2013.01); *G01L 27/005* (2013.01)

(58) Field of Classification Search
CPC ......... G01L 1/103; G01L 1/106; G01L 11/02; G01L 11/025; G01L 27/005
See application file for complete search history.

(56) References Cited

U.S. PATENT DOCUMENTS

| | | | | | |
|---|---|---|---|---|---|
| 4,743,752 A | * | 5/1988 | Olsen | ..................... | G01D 5/268 |
| | | | | | 250/206.1 |
| 5,995,260 A | * | 11/1999 | Rabe | .................... | H04R 23/008 |
| | | | | | 398/115 |

(Continued)

FOREIGN PATENT DOCUMENTS

WO   WO-2018024713 A1 *  2/2018   ........... G01N 29/022

OTHER PUBLICATIONS

Advantages and Benefits of Fiber Lasers, White Paper from SPI Lasers (Year: 2017).*

(Continued)

*Primary Examiner* — David L Singer
(74) *Attorney, Agent, or Firm* — Rosenberg, Klein & Lee

(57) ABSTRACT

An optomechanical pressure-measurement system measures pressure in the range of $10^{-6}$ Pa-$10^{-2}$ Pa by measuring various properties of a vibrational mode of an ultra-thin membrane member. With independent measurements of the thickness and density of the membrane, in addition to the measured vibration mode properties, the system can operate as a primary pressure sensor. The membrane member is mounted on a vibration-isolated mount and is excited by a drive force. A laser beam impinges on the excited membrane, and an optical phase detector detects the amplitude of the oscillations, as well as parameters of the laser beam affected by the membrane vibration. In one embodiment, a mechanical damping is computed based on the amplitude or (Continued)

frequency shift (depending on the pressure range), and the pressure based on the ring-down time of the membrane vibration mode.

20 Claims, 4 Drawing Sheets

(56) References Cited

U.S. PATENT DOCUMENTS

| | | | | |
|---|---|---|---|---|
| 2004/0071383 | A1* | 4/2004 | Balachandran | G02B 6/4246 385/12 |
| 2004/0250625 | A1* | 12/2004 | Kogan | G01L 21/22 73/702 |
| 2005/0146726 | A1* | 7/2005 | Balachandran | G01D 5/35303 356/480 |
| 2011/0023617 | A1* | 2/2011 | Yu | G02B 6/4214 73/705 |
| 2012/0210797 | A1* | 8/2012 | Yu | G02B 6/4214 73/705 |
| 2013/0233086 | A1* | 9/2013 | Besling | G01L 9/0045 73/724 |
| 2016/0211828 | A1* | 7/2016 | Simmonds | G02B 6/1225 |

OTHER PUBLICATIONS

High Power Fiber-Coupled Multi-Wavelength LED Light Sources, FiberTech Optica (Year: 2016).*

Semiconductor For You, What are the advantages and disadvantages of Laser diode? (Year: 2017).*

Rushton, et al. "The feasibility of a fully miniaturized magneto-optical trap for portable ultracold quantum technology." Rev. Sci. Instrum. 85, 121501 (May 2014). doi: 10.1063/1.4904066.

Scherschligt, et al. "Quantum-based vacuum metrology at the National Institute of Standards and Technology." J. Vac. Sci. Technol. A 36, 040801 (Jun. 2018). doi: 10.1116/1.5033568.

* cited by examiner

OPTOMECHANICAL PRESSURE MEASUREMENT SYSTEM AND METHOD USING THE VIBRATIONAL MODES OF A MEMBRANE

STATEMENT REGARDING FEDERAL SPONSORED RESEARCH OR DEVELOPMENT

This invention is made with government support under 70NANB16H168 awarded by NIST. The government has certain rights in the invention.

REFERENCE TO RELATED PATENT APPLICATION(S)

This Utility Patent Application is based on a Provisional Patent Application Ser. No. 62/686,789 filed on 19 Jun. 2018.

INCORPORATION BY REFERENCE

The following article is incorporated by reference in its entirety: Julia Scherschligt, James A. Fedchak, Zeeshan Ahmed, Daniel S. Barker, Kevin Douglass, Stephen Eckel, Edward Hanson, Jay Hendricks, Nikolai Klimov, Thomas Purdy, Jacob Ricker, Robinjeet Singh, Jack Stone, 'Quantum-based vacuum metrology at NIST', in press at Journal of Vacuum Science and Technology B (2018).

FIELD OF THE INVENTION

The present invention is directed to a pressure measuring system, and more in particular, to a pressure measuring system capable of measuring high vacuum in the range of $10^{-6}$ to $10^{-2}$ Pa.

The present invention is also directed to a pressure measuring system equipped with a membrane member contained within the vacuum to be measured, and determining the pressure by measuring various properties of a vibrational mode excited in the membrane member.

Furthermore, the present invention is directed to a simple, robust and sufficiently stable optomechanical pressure measuring system using the vibrational modes of a membrane member positioned in a vacuum chamber which can operate as a pressure sensor as well as a transfer standard (which is a measurement standard used as an intermediate device when comparing two other standards).

The present invention is also directed to a quantum based vacuum measuring gauge which may operate in combination with the Fixed-Length Optical Cavity (FLOC) and the Cold Atom Vacuum Standard (CAVS) quantum mechanical systems which sense pressure in the vacuum, thus realizing measuring instruments that can cover the broad pressure range from a few atmospheres to the lowest achievable laboratory vacuums.

BACKGROUND OF THE INVENTION

Traditionally, pressure is defined as a force per unit area. However, as pressure extends further and further below an atmosphere (deeper into the vacuum), this definition becomes inconvenient and impractical. Instead, at low pressures, the unit of pressure, Pascal (Pa), is realized through the ideal gas law in accordance with:

$$p = \rho_N k_B T = \rho_v RT, \quad \text{(Eq. 1)}$$

where $\rho_N$ is the number density of particles and $\rho_v$ is the molar density, R is the gas constant, and T is the temperature.

In this formulation, pressure metrology becomes a counting problem, specifically, counting particles in the vacuum by any available technique. Due to the fact that in the high vacuum (HV) and Ultra-high vacuum (UHV), most users are concerned with the amount of gas in the vacuum, e.g., as a contaminant, rather than the force it produces, such formulation is highly applicable in the field of pressure measurement.

Eq. 1 fundamentally relates pressure to the Boltzmann constant $k_B$, which becomes a fixed constant with the redefinition of the International System of Units (SI) in 2018.

With modern techniques and the trend away from artifact-based metrology, the National Institute of Standards and Technology (NIST) and other institutes are developing the Quantum-SI, a metrology paradigm in which measurements are performed by making observations of quantum phenomena. With this new way of realizing the SI, the units are tied to defined physical constants, e.g. Plank's constant or the speed of light in vacuum.

Furthermore, there is an accompanying shift away from electronic to photonic measurements. Measuring photons, instead of electrons, has several inherent benefits which include: (a) optical signals are generally less prone to pick-up noise from stray signals than are electrical signals, especially for long transmission distances; (b) photonic signals are high-fidelity, and can travel farther without regeneration; (c) additionally, optical fiber is lighter and has a larger bandwidth per cross-sectional area than copper wire, and can better handle harsh conditions, and so it has practical advantage, especially for use in aircraft or launch vehicles. Photonic measurements can be readily multiplexed and allow remote interrogation; and furthermore, (d) photons can be used to directly probe the electronic states of atoms or molecules, and to prepare quantum states, making them the tool of choice for fundamental quantum measurements.

At pressures from about an atmosphere to the high vacuum, classical metrology technologies can deliver uncertainties at levels which generally are adequate for users. In consideration of this, the NIST efforts to recast the SI in terms of quantum effects are not an attempt to further reduce uncertainties (although this may become possible with development of novel technologies), but rather, by developing quantum-SI based techniques at the higher ranges of pressure, the goal is to enable users to have their own standards that are of the highest metrological integrity that never need calibration.

Furthermore, the new technologies may enable users to use the same device as a primary standard and a sensor, or as calibration-free sensors. Another advantage of pressure standard based on the Fixed-Length Optical Cavity (FLOC) technique is that it aims to replace traditional mercury manometers, which are often used in the vacuum range of $10^{-3}$ Pa to $10^5$ Pa, thus removing toxic mercury from the calibration lab. The primary high-accuracy manometers used in this pressure range also tend to be rather large, expensive, and require a high level of expertise to operate, and are thus usually owned and operated by national metrology institutes or sophisticated calibration laboratories. The FLOC and the other quantum-SI techniques, such as the Cold Atom Vacuum Standard (CAVS) all have the perspective to be portable primary standards.

In the Ultra-high Vacuum (UHV), using photons to probe pressure is very appealing compared to the traditional ionization gauges and quadrupole mass spectrometers. In the gas sensing techniques, ions are created via impact with electrons emitted from a hot-filament or, as is the case for a cold-cathode gauge, in a high-potential cathodic discharge. These ions are then detected by generating a current on an electrode or by an electron multiplier.

Although these techniques have been the mainstay for UHV detection for several decades and many improvements have been made to make them more stable or to detect lower vacuum levels, they have not been completely satisfying for measuring total or partial pressures in the UHV or extreme-high vacuum (XHV) below $10^{-9}$ Pa for several reasons:

(a) the heat generated by these gauges cause sufficient outgassing to change the pressure in a vacuum system;
(b) the electron impact can "crack" molecules into fragments thus changing the chemical composition of the gas (a particular problem in partial pressure analysis);
(c) the chemical composition can also be altered by chemical reactions on the hot filaments or other surfaces within the ionizer;
(d) the ionization technique does not produce a primary sensor, i.e., an absolute sensor that does not require calibration;
(e) additionally, electron-stimulated desorption (ESD) of ions from surfaces and the generation of X-rays due to electron impact on surfaces cause false signals.

Photonic and quantum-SI methods have the potential to create absolute sensors without these problems. The heat-load on the vacuum system generated by photons is anticipated to be many orders of magnitude less than in ionization techniques. This reduces the possibility of changing the chemical composition of the gas and outgassing in the system. Most users for UHV or XHV metrology require uncertainties on the order of parts per hundred, but, as presented in previous paragraphs, presently there is no primary sensor in this vacuum range.

NIST has supported vacuum metrology through its calibration services and by developing and maintaining vacuum standards. Presently these cover the vacuum range down to $10^{-7}$ Pa. These efforts support a wide variety of industries and research, such as semiconductor manufacturing, quantum information, particle physics facilities, space sciences, and nanotechnology.

Developing quantum-SI standards to cover the present range of NIST's capabilities, as well as pushing standards to cover vacuum to $10^{-10}$ Pa or below (XHV), is a high priority. The goal is to create portable absolute sensors which are primary standards never requiring calibration, that can be owned by users outside of the national metrology laboratory. The particular goal is to develop quantum-SI sensors to cover the entire UHV range and below.

A new era of high metrological quality quantum-SI sensors is visualized which is based on cold atoms measure quantities such as time (which is already based on ultra-cold atoms), inertia, magnetic fields, gravity, and, of course, vacuum pressure. All such devices, and ultra-cold atom research in general, require UHV pressures or below to operate. Similarly, UHV quality is a concern in the field of quantum information. Building practical sensors and devices from cold atoms will require that UHV pressure be maintained over the lifetime of the device. Metric $10^{-8}$ Pa was suggested for 1000 days (J. A. Rustuton, et al., Rev. Sci Instrum., 85, 2014). The vacuum requirements are a technical challenge in creating such devices.

Conventionally, a spinning-rotor gauge is used in the high vacuum pressure regime. The spinning rotor gauge has a zero-offset that disadvantageously is unpredictable to within about two orders of magnitude, roughly equivalent to a nitrogen pressure of 0.2 µPa to 10 mPa. This offset is different each time the gauge is operated and must be measured by evacuating a chamber and comparing the spinning rotor gauge reading to another vacuum gauge. Thus, the spinning rotor gauge requires a second gauge which is to be used to monitor the pump-down of the vacuum system.

Further, the spinning rotor gauge has a disadvantage of inability to be a primary standard for pressure. In addition, the spinning rotor gauge tends to be sensitive to external magnetic fields and orientation (tilt) of the device.

It therefore would be desirable to provide a photonic-based system capable of measuring high vacuum, which would have as a zero-offset consistent over the lifetime of the gauge and would potentially be calculable, which would not require a second gauge to monitor the pump-down of a vacuum system, which can be used as a primary standard for pressure, and which would also be expected to have a large dynamic range, from a high vacuum up to an atmosphere. Also, it would be desirable to have the high vacuum pressure measuring system which would not be sensitive to external magnetic fields and the orientation of the device.

SUMMARY OF THE INVENTION

It is therefore an object of the present invention to provide a mechanical damping gauge for high vacuum in range of $10^{-6}$ to $10^{-2}$ Pa, which is simple, robust, and sufficiently stable to operate as a sensor and a transfer standard.

It is also an object of the present invention to provide pressure measuring sensor which, in combination with the FLOC or the CAVS systems, may realize a suite of instruments that covers the broad pressure range from a few atmospheres to the lowest achievable laboratory vacuums (as described in J. Scherschligt, et al., "Quantum-based Vacuum Metrology at NIST", Journal of Vacuum Science and Technology, B (2018), incorporated herein by reference in its entirety).

It is an additional object of the present invention to provide a gauge based on the ring-down time of a membrane exhibiting the following advantages:

(a) the zero-offset should be consistent over the lifetime of the gauge, and be calculable,
(b) it does not require a second gauge, and can be used to monitor the pump-down of a vacuum system, which is not possible with the conventional spinning rotor gauge,
(c) the ring-down membrane gauge may function as a primary standard for pressure, which is not the case for the conventional spinning rotor gauge, and
(d) the membrane gauge is also expected to have a large dynamic range, up to an atmosphere, and have the ability to accurately determine pressure from atmosphere to $10^{-5}$ Pa which is unmatched by present commercial technologies.

In addition, an object of the present invention is to provide a pressure gauge which is immune to magnetic fields, electromagnetic pickup and tilt, and produces no magnetic field emission, elevated temperatures, or ionization.

In one aspect thereof, the present invention is directed to an optomechanical pressure measuring system capable of measuring the pressure ranging between $10^{-6}$ Pa to $10^{-2}$ Pa, using the vibration modes of a membrane member, which includes:
a membrane member, and
a vibration-isolated mounting sub-system. The membrane member is mounted in a vacuum chamber in contact with the vibration-isolated mounting sub-system.

The ultrathin membrane is fabricated from a material transmissive by or reflective to the incident light beam generated by the light source.

The vibration-isolated mounting sub-system may be any of phononic bandgap structures, a wire, a cantilever, a spring suspension, etc.

The subject system further includes a light source generating a light beam impinging on the membrane member, and a mechanical drive operatively coupled to the membrane member.

The mechanical drive imparts a controlled force on the membrane member to excite a vibration mode therein.

The light source may be a single-frequency diode laser, a fiber laser, a fiber-coupled light-emitting diode, etc.

The mechanical drive sub-system may be a piezoelectric drive, optical radiation pressure drive, photothermal drive, photo-acoustic drive, electro-static drive, magnetic drive, thermal expansion drive, etc.

An optical phase detector is operatively coupled to the membrane member. The optical phase detector is configured to detect one or several parameters (properties) of the light reflected from or transmitted through the membrane member. These properties reflect the changes in the light beam caused by the vibrating modes excited in the membrane member, and may include, but not limited to, for example, an amplitude of vibrations (oscillations), a resonant frequency shift, a phase shift, as well as an angular deflection of the light beam caused by the vibration modes excited in the membrane by the drive force. In one embodiment of the subject measuring scheme, the amplitude of the excited vibration mode in the membrane member is used to measure a mechanical damping characteristic, i.e., the ring-down time of the excited vibration mode in the membrane, based on changes in the amplitude of the detected oscillations over time, which is used to compute the pressure.

The subject system further includes a computer system operatively coupled to the optical phase detector to compute a pressure in the vacuum chamber based on one or various properties of the vibration mode(s) excited in the membrane member, such as, for example, the mechanical ring-down time, or other properties of the vibration modes in the membrane reflected by the measured phase shift, frequency shift, or the angular deflection of the light beam transmitted through or reflected from the membrane, etc.

The optical phase detector may be a Fabry-Pérot interferometer, Mach-Zehnder interferometer, Michelson-Morley interferometer, a spatial-mode interferometer, etc.

The optical phase detector detects parameters of the light beam transmitted through or reflected from the membrane element which are characteristic of the vibration modes excited in the membrane element. For example, the optical phase detector may measure the amplitude of oscillations to determine the ring-down time $T_{rd}$ of the excited vibration modes, or the phase shift, or the resonant frequency shift, or the angular deflection of the laser beam which are subsequently used to compute the pressure.

The computer system, in one embodiment, may compute the pressure in the vacuum chamber in accordance with $$\frac{1}{\tau_{rd}} = \Gamma_{tot} = \Gamma_i + \sqrt{\frac{32}{\pi} \frac{m_m}{k_B T}} \frac{1}{\rho h} p \quad \text{(Eq. 2)}$$

where $m_m$ is the molecular mass of the gas contained in the vacuum chamber at pressure p, ρ is the density of the material of the membrane member, h is the membrane thickness, T is the temperature, $\Gamma_i$ is the intrinsic mechanical decay rate of the membrane member, and $k_B$ is the Boltzmann constant.

In another aspect, the present invention is directed to a method for high vacuum pressure measurements in the range of $10^{-6}$ Pa to $10^{-2}$ Pa using vibrational modes excited in an ultrathin membrane. The method comprises the steps of:

(a) establishing a pressure sensor system by mounting an ultra-thin membrane member in a vacuum chamber on a vibration-isolated mount structure, coupling a mechanical drive sub-system to the membrane member, aligning a light beam generated by a light source with the membrane member, impinging the light beam on the membrane member, and aligning an optical phase detector with the membrane member;

(b) applying a drive force by the mechanical drive subsystem to the membrane member to excite a vibration mode in the membrane member, (c) detecting, by the optical phase detector, an amplitude of vibrations, or other parameters of the light beam reflected off or transmitted through, the membrane (these parameters reflect the properties of the oscillations of the excited vibration modes in the membrane member);

(d) measuring the properties of the vibration modes, for example, a mechanical damping characteristic of the oscillations, and (e) computing, by a computer, the pressure based on the mechanical damping characteristic and the thickness of the membrane member, or based on alternative measured parameters, such as, for example, resonance frequency shift, phase shift, angular deflection, etc. of the light beam transmitted through or reflected off the membrane.

These and other objects and advantages of the present invention will become apparent from the reading of the section of preferred embodiments of the present invention in conjunction with accompanying Patent Drawings.

DETAILED DESCRIPTION

Figure 1:
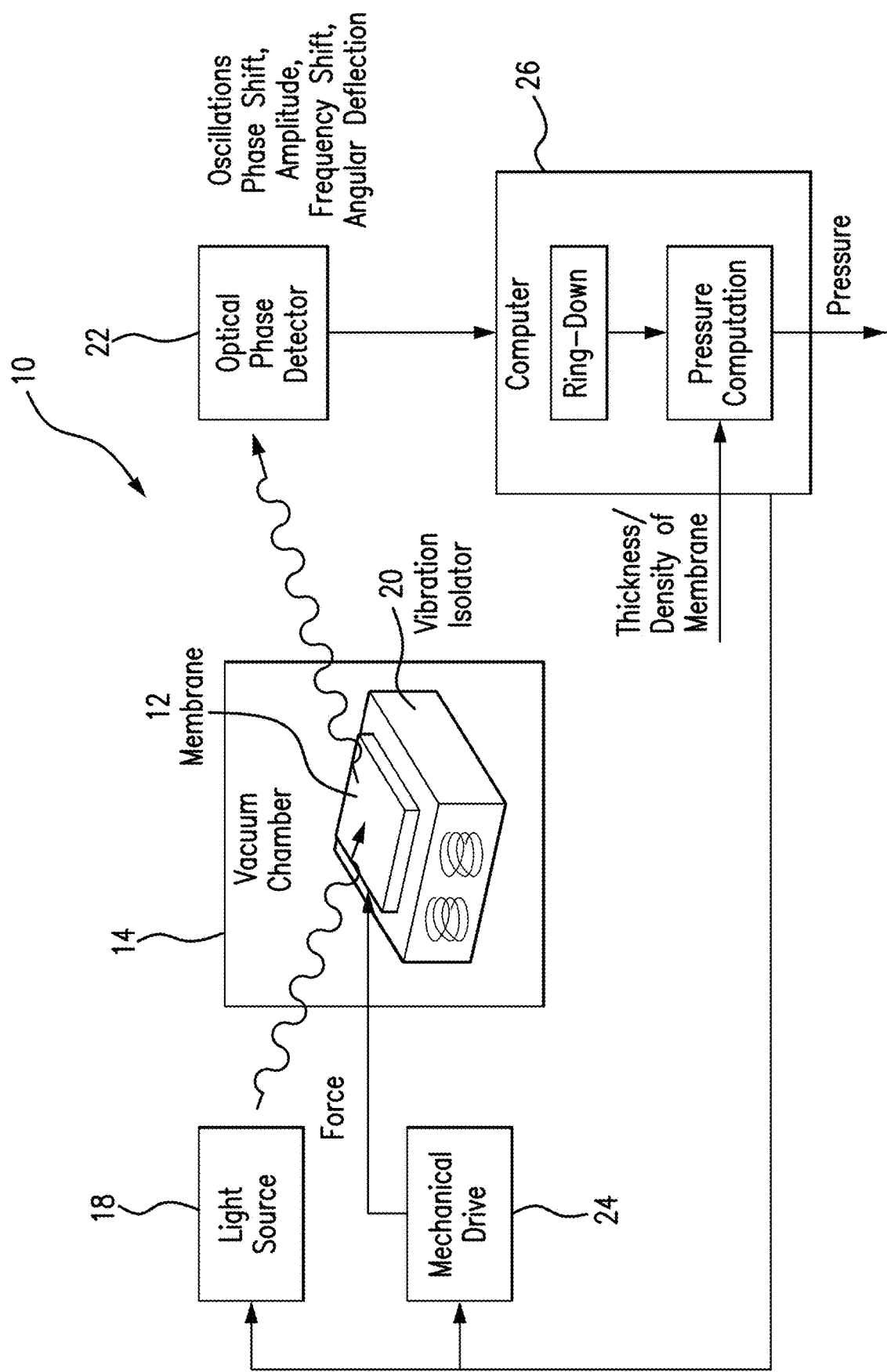
FIG. 1 is a schematic representation of the subject system for pressure measuring using the vibrational modes excited in a membrane member.

The subject pressure measuring system uses properties of the vibration modes excited in a membrane, for example, damping properties. Mechanical damping by drag forces may be used for a wide range of vacuum pressure sensors. The subject system relates to a class of oscillating mechanical resonators, which are desirable for pressure measurements because they may operate as absolute pressure sensors with high linearity, operate at high frequencies away from DC to minimize low frequency noise and drift, often allow for direct computation of pressure dependence from first principles, and do not generate large amounts of heat. The linear dynamic range is limited by intrinsic mechanical dissipation at low pressure, and the transition from molecular flow to viscous damping at high pressure.

The subject system demonstrates the ideal properties for pressure measurements, which include a low intrinsic mechanical dissipation and a mechanical element that is smaller than the mean free path of the gas being measured at the highest pressures of interest. A larger mechanical element would still exhibit pressure-dependent damping.

The subject system (shown in FIGS. 1-2) is realizable due to recent experimental progress in the field of quantum optomechanics which has led to the development of optically detected and actuated mechanical resonators, well suited for gas damping pressure sensing. The mechanical sensing element 12 in the subject system 10 is an ultralow intrinsic damping rate, $\Gamma_i$, membrane, whose out-of-plane drumhead modes (as shown in FIG. 2) have ultrahigh intrinsic mechanical quality factor ($Q=\omega_m/\Gamma_i$), approaching 1 billion.

With millimeter scale transverse extent and the thickness, h, in the nanometer range, this mechanical resonator is readily damped by the surrounding gas (in the vacuum chamber) 14, while retaining resonance frequencies, $\omega_m/2\pi$, in the hundreds of kilohertz.

The subject system 10 attains a simple optical readout, is insensitive to low frequency vibration, immune to magnetic fields and sensor tilt, and does not require active stabilization.

The total mechanical damping rate, which is the inverse of the mechanical ring-down time, $\tau_{rd}$, in the molecular flow regime is presented by $$\frac{1}{\tau_{rd}} = \Gamma_{tot} = \Gamma_i + p\sqrt{\frac{32}{\pi}\frac{m_m}{k_B T}}\, 1/\rho h \qquad \text{(Eq. 3)}$$

where $m_m$ is the molecular mass of the gas in the vacuum chamber at pressure p, $\rho$ is the density of the material of the membrane member, h is the membrane thickness, T is the temperature, and $\Gamma_i$ is the intrinsic mechanical decay rate of the membrane member, and $k_B$ is the Boltzmann constant (the physical constant with value equal to $1.38064852 \times 10^{-23}$ Joules/Kelvin).

The subject system demonstrates that sub-mHz intrinsic damping rates are achievable, which are equivalent to the damping from air pressure in the $10^{-5}$ Pa range. For the subject system, the transition region to the viscous flow regime is estimated to be above 1 Pa, implying that the subject system can operate as a large dynamic range gauge.

Referring to FIGS. 1-4, the present system 10 (also referred to herein intermittently as a sensor gauge) measures pressure by measuring the properties of a vibrational mode excited in a membrane element (also referred to herein as a membrane member) 12 contained within a vacuum (vacuum chamber) 14.

The system 10 uses a vibrational drive sub-system 24 and a light source (such as, for example, a laser) 18. The vibrational drive sub-system 24 is operatively coupled to the membrane member 12 to excite vibration mode(s) therein. The system 10 measures one or various properties of the vibration mode(s) to compute the pressure in the vacuum chamber 14 based on the measurements.

The mechanical drive sub-system 24 in the subject system 10 may be in any configuration including, but not limited to, piezoelectric, optical radiation pressure, photo-thermal, and photo-acoustic, electrostatic, magnetic, thermal expansion, etc., provided that the mechanical drive sub-system 24 imparts a drive force onto the membrane element 12 capable of exciting a mode of vibration.

In one embodiment, the subject system 10 is configured to measure the ring-down time of the vibrations excited in the membrane element 12. The ring-down time is related to a pressure to be measured in the subject system.

The system 10 measures pressure, by measuring the properties (including, but not limited to, the mechanical damping rate and/or the resonant frequency shift) of a vibrational mode of the vibration element (membrane) 12 contained within the vacuum chamber 14. With independent measurements of the thickness and density of the membrane element 12, the sensor gauge 10 becomes a primary pressure sensor.

The ultra-thin membrane element 12 in the subject pressure measurement gauge 10 may be fabricated from a material which is either transmissive or reflective of a laser light and supports discrete vibrational modes. There are numerous alternative crystalline or amorphous materials that can be used for the membrane member fabrication, such as, for example, suspended thin film resonator structures made out of silicon, gallium arsenide, silicon carbide, silicon dioxide, gold, and aluminum. The choice of material may depend on the ease of fabrication, reflectivity at the wavelength of the probing laser 18, possibility of integrating piezoelectric or electrostatic drive 24, etc.

The transverse dimensions of the membrane member 12 may range from few microns to few millimeters in side length. The thickness of the membrane may in the nanometer range, for example, below 20 nm-30 nm, although some experiments were conducted with the thickness of up to 50 nm. The dimensions of the membrane member 12 can be adjusted for fabrication of the gauge 10 useful in a desired pressure range. Membranes with a small size length (micrometers) are more suitable for higher gas pressures, while larger membranes (millimeters) are more useful at lower pressures.

The membrane member 12 must be mounted in a vibrationally isolated way within the vacuum chamber 14, thus the system 10 further includes a vibration-isolated mounting structure 20. The vibration-isolated structure 20 may constitute various configurations including a phononic bandgap structure, a wire, a cantilever, or a spring suspension, and similar structures.

The light source 18 in the subject pressure measuring gauge 10 may be of any type compatible with a chosen detection system. The light source 18 may include, but not limited to, a single-frequency diode laser, fiber laser, fiber-coupled light emitting diode, etc.

The subject system 10 further includes a detection system for acquiring parameters useful in the pressure measurements and reflective of the vibration modes excited in the membrane. The detection system may be in the form of an optical phase detector 22 which may be any type of an interferometer, including but not limited to, a Fabry-Pérot, Mach-Zehnder, Michelson-Morley Interferometer, Spatial-Mode Interferometer, etc.

In the process, the optical phase detector 22 detects the parameters of oscillations excited in the membrane 12, as well as the characteristics of the laser beam transmitted through, or reflected from, the membrane member 12 caused by vibrational mode the membrane member 12 generated as the result of the drive force imparted thereto by the mechanical drive sub-system 24. When the light beam parameters are detected, the optical phase detector 22 provides the readings to a computer system 26 which is configured to compute the pressure in the vacuum chamber 14 based on the measured parameters of the transmitted through or reflected light beam, and/or the corresponding properties of the vibration modes excited in the membrane member 12.

Such parameters/properties useful in the pressure computations may include, for example, mechanical damping property of the oscillations, or resonant frequency shift, or phase shift of the oscillations, or the angular deflection of the light beam, caused by of the membrane's vibration mode measured by the optical phase detector 22. Various parameters of the membrane member 12, such as, for example, the thickness of the membrane element 12, as well as the density of the material of the membrane member, etc., which may be independently measured, are also relied upon in the pressure computations, as will be presented in further paragraphs.

Figure 2:
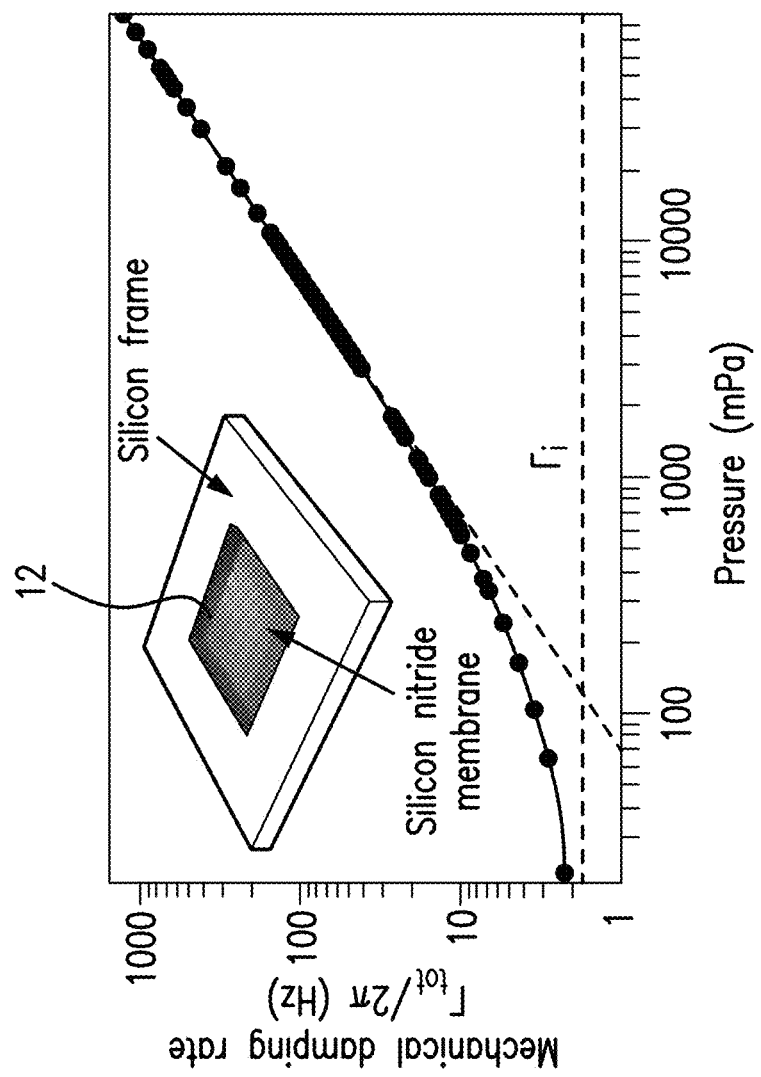
FIG. 2 is a diagram representative of measuring results for an experimental silicon nitride membrane-based mechanical damping gauge with an inset showing fundamental out-of-plane vibration mode.
Figure 3:
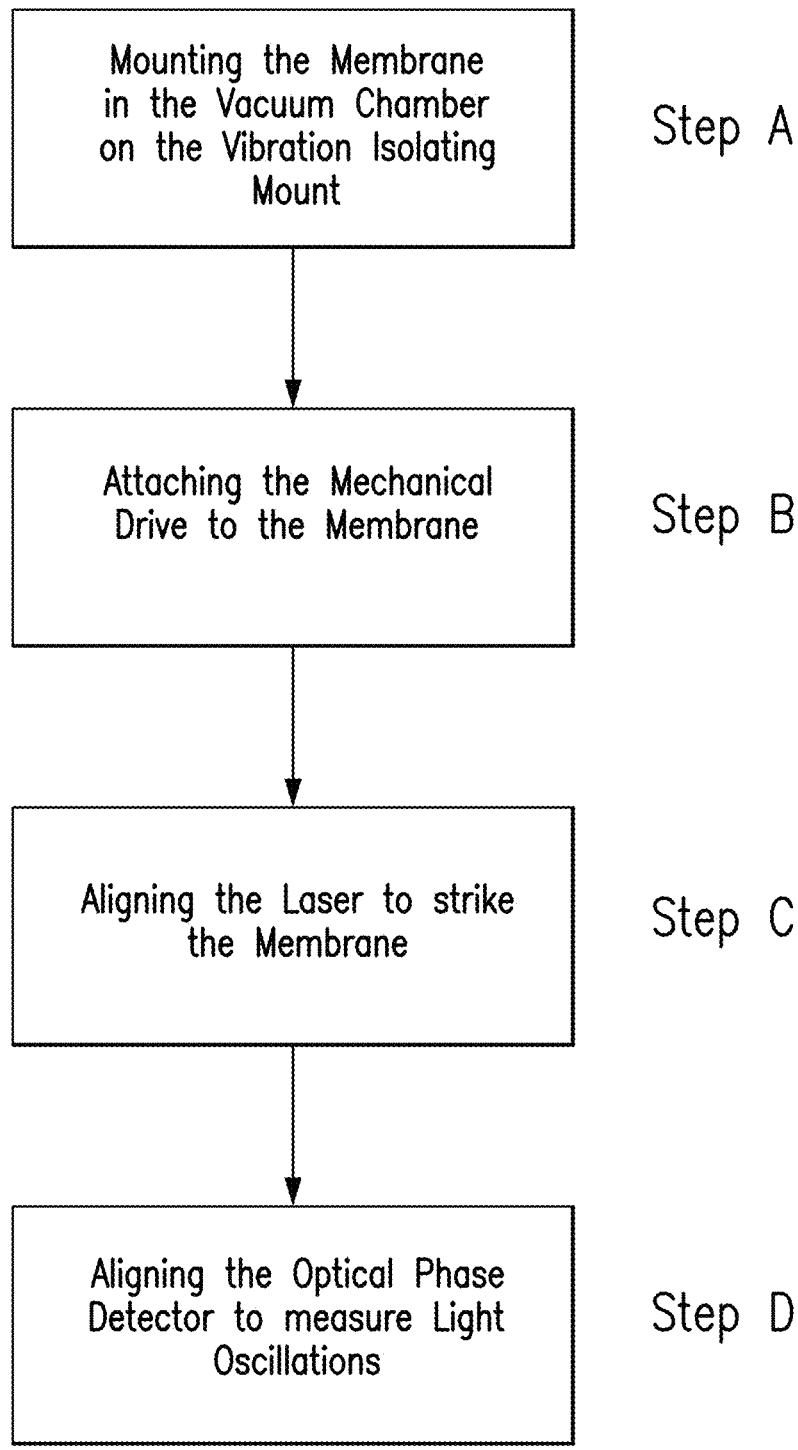
FIG. 3 is a diagram representative of the sequence of steps for forming the subject pressure sensor system.
Figure 4:
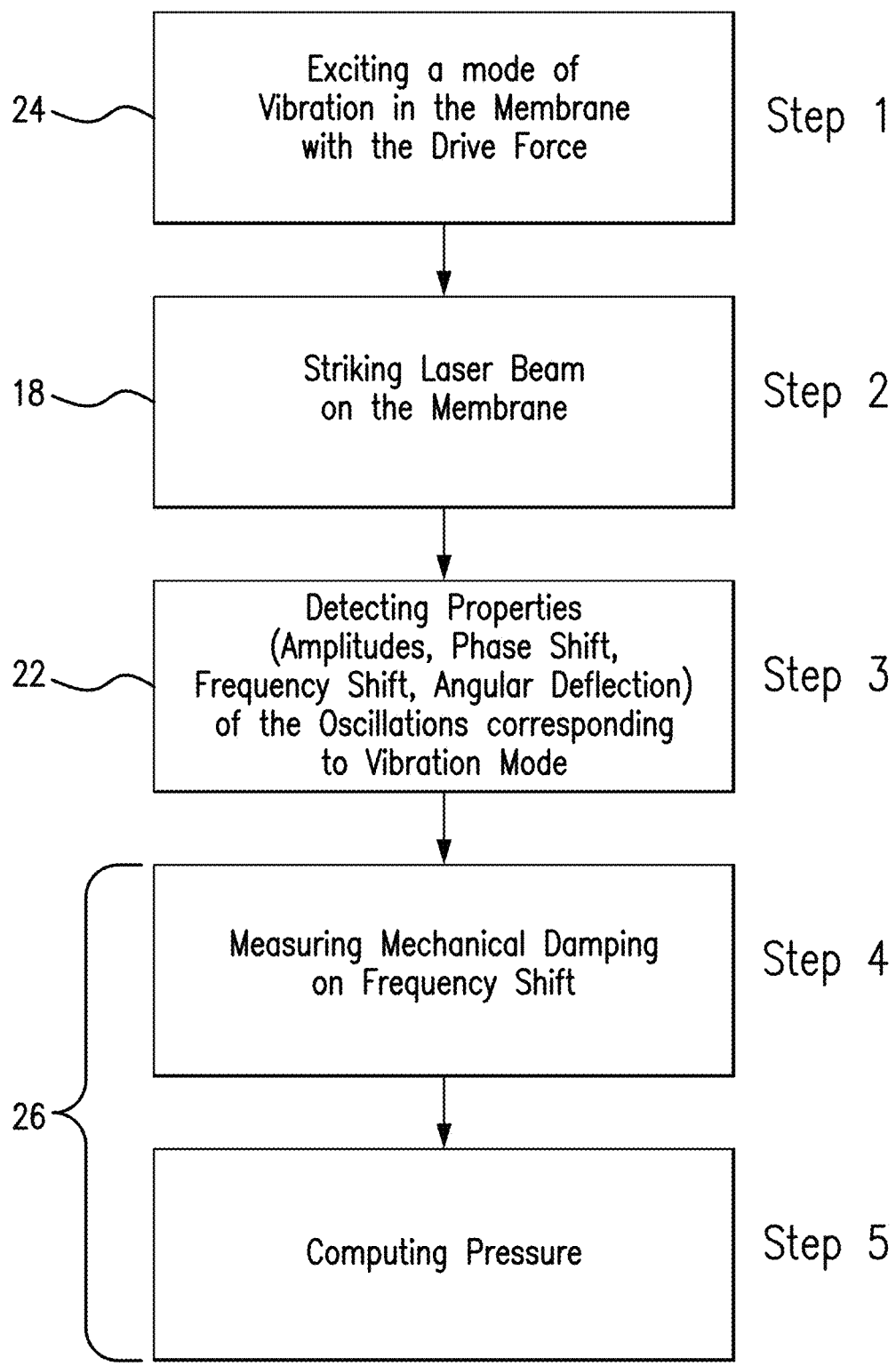
FIG. 4 is a diagram representative of the process for measuring pressure using the subject pressure measuring system.

As depicted in FIGS. 1 and 3, the pressure sensor system 10 (also referred to herein as the pressure measuring gauge), is configured in the following sequence of technological steps:

Step A—mounting the membrane element 12 within the vacuum chamber 14 on the vibration-isolated mounting structure 20;

Step B—operatively coupling the mechanical drive sub-system 24 to the membrane element 12;

Step C—aligning the laser 18 to strike the membrane element 12 at a predetermined incident angle; and Step D—aligning the optical phase detector 22 to measure one or several parameters of the light either transmitted through or reflected off (dependent on the material) the membrane member from the membrane element 12. Such parameters may include, for example, the amplitude of vibrations, or phase shift of the light beam, as well as the resonant frequency shift and angular deflection of the light beam reflected off or transmitted through the membrane 12.

The alignment of the laser 18 depends on the type of the optical phase detector 22 used in the measurement scheme. For example, if using the optical phase detector in the Michelson interferometer configuration, the incident signal beam emanating from the laser 18 should ideally be focused on the center of the membrane 12. If, however, using the optical phase detector in the deflection measurement configuration (to measure an angular deflection of the laser beam transmitted through or bounced from the membrane member from the impinging laser beam), the incident signal beam should be focused on the node line of the out-of-plane vibrational mode.

The normal incidence for the laser beam onto the membrane 12 is considered to be ideal. The out-of-plane mechanical resonator modes are the preferred modes to be probed for the subject measurement scheme, although numerous alternative angles of the light incidence are also contemplated in the present system.

Mechanical modes can be probed either in continuous or pulsed regime. The choice of the laser spot on the membrane 12 to be probed depends on the interferometer configuration.

The subject system 10 is used for measuring the pressure. As depicted particularly in FIG. 4 in conjunction with FIG. 1, the process for measuring the pressure includes the following steps:

Step 1—applying a driving force with a mechanical drive sub-system 24 to the membrane element 12 to excite a mode of vibration in the membrane element 12;

Step 2—striking laser beam on the membrane element 12;

Step 3—detecting, using the laser 18 and the optical phase detector 22, a property of the vibration mode excited in the membrane. Such property may include, for example, the amplitude of the light oscillation due to the vibration mode excited in the membrane member 12. The phase shift, resonance frequency shift, or angular deviation of the laser beam reflected off the membrane may also be measured in Step 3 depending on the chosen measuring scheme as well as the type of the detection configuration;

Step 4—measuring, in one embodiment, the mechanical damping (based on the amplitude of oscillations) or the resonance frequency shift, dependent on the pressure range; and Step 5—computing the pressure based on either the ring-down time of the oscillation caused by vibrational mode excited in the membrane element 12, or other properties of the vibration modes in the membrane 12.

In Step 1, the driving force applied to the membrane 12 should be of a magnitude and direction capable of driving the mechanical mode several orders of magnitude above the otherwise ambient thermal motion of the membrane. The upper limit of the driving force is defined by the limit above which the mechanics (membrane) responds nonlinearly.

In Step 5, the ring-down time is defined as the time between the detection of an initial amplitude of the oscillation by the optical phase detector 22 and the moment when the amplitude of the oscillations drops to 1/e times of the initial amplitude, where e is a mathematical constant with the value approximately equal to 2.718281828459046.

The results measuring the ring-down time with varying pressures of air in the vacuum chamber are shown in FIG. 2. The pressure, as measured by the membrane ring-down time method was verified against a commercial capacitance manometer.

In one embodiment, the motion of the mechanical element (membrane) is transduced as a phase shift onto the light beam reflected off the membrane. The phase of the reflected signal (laser beam) should be matched with that of the local oscillator if the Michelson interferometer configuration is used. The amplitude of motion, as measured by the optical phase shift, is used to determine the ring-down time of the mechanical resonator.

In an alternative embodiment, a laser beam deflection measurement scheme may be used, where the motion of the membrane member 12 is transduced to an angular deviation of the path of the reflected light. In this case, the phase shift becomes unimportant.

Alternatively to measuring the pressure based on the ring-down time, another parameter of the membrane vibration mode, for example, the resonant frequency shift, can be used in the subject measurement scheme for pressure measurements. The resonance frequency shifts for the mechanical resonator may become important at higher gas pressures where the restoring forces due to surrounding gas become comparable to the mechanical spring constant of the membrane resonator out-of-plane drumhead mode. For small shifts in the resonance frequency, the shift in resonance frequency is proportional to the square of the pressure.

In Step 4, the mechanical damping is suitable for both low and high pressure measurements. The frequency shift is considered suitable for high pressure.

FIG. 2 depicts preliminary results for a silicon nitride membrane based mechanical damping gauge. A linear dynamic range was demonstrated over two orders of magnitude, limited by excess dissipation of mechanical energy into the membrane mounting structure 20.

An optimized geometry and mounting should extent the dynamic range by several more orders of magnitude, as well by employing higher order mechanical modes of the membrane. The slope sensitivity in the linear region of FIG. 2 agrees with the prediction of Eq. (3) at the approximately 10% level, limited by uncertainty in the membrane thickness and density.

In the embodiment presented, a larger surface area of the silicon nitride membrane 12 and better vibrational isolation enhances the low-pressure performance. In addition, embodiments may include thermal noise technique (or other techniques) to calibrate the physical properties of the membrane element 12, and thus make it a primary sensor.

The subject mechanical damping gauge for high vacuum in the range of $10^{-6}$ to $10^{-2}$ Pa has been attained, which is simple, robust, and sufficiently stable to operate as a sensor and transfer standard. The successful combination of the subject system 10 with the FLOC and the CAVS technologies, described in the J. Scherschligt, et al., Journal of Vacuum Science and Technology, B (2018), is believed to realize instruments that cover the broad pressure range from a few atmospheres to the lowest achievable laboratory vacuums.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. An optomechanical pressure measuring system, comprising:
    a membrane member,
    a vibration-isolated mounting sub-system, said membrane member being mounted in a vacuum chamber in contact with said vibration-isolated mounting sub-system,
    a light source generating a light beam impinging on said membrane member,
    a mechanical drive operatively coupled to said membrane member and imparting a force thereon to excite a vibration mode therein,
    an optical phase detector operatively coupled to said membrane member and configured to detect at least one property of the excited vibration mode in said membrane member, said at least one property being selected from a group consisting of an amplitude of said vibration mode, a resonant frequency shift, a phase shift, and an angular deviation of the light beam reflected from or transmitted through said membrane member, a mechanical ring-down time of said vibration mode excited in said membrane member, and a combination thereof, and
    a computer system operatively coupled to said optical phase detector to compute a pressure in said vacuum chamber based on said at least one property of said vibration mode excited in said membrane member, said at least one property being computed as a function of: a molecular mass of a gas in said vacuum chamber, a density of the membrane member material, a thickness of the membrane member, a temperature within the vacuum chamber, an intrinsic mechanical decay rate of the membrane member, and the Boltzmann constant.

2. The system of claim 1, wherein said membrane member is an ultra low intrinsic damping rate membrane fabricated from a material supporting discrete vibration modes in said membrane member and transmissive or reflective of said light beam.

3. The system of claim 1, wherein said membrane member is fabricated from at least one material selected from a group consisting of silicon nitride, silicon, gallium arsenide, silicon carbide, silicon dioxide, gold, aluminum, and a combination thereof.

4. The system of claim 1, wherein said membrane member is fabricated from silicon nitride.

5. The system of claim 1, wherein said membrane member is dimensioned with a thickness in a nanometer range and length and width each ranging from μm range to mm range.

6. The system of claim 1, wherein said vibration-isolated mounting sub-system is selected from a group consisting of a phononic bandgap structure, a wire, a cantilever, a spring suspension, and a combination thereof.

7. The system of claim 1, wherein said light source is selected from a group consisting of a single-frequency diode laser, a fiber laser, a fiber-coupled light-emitting diode, and a combination thereof.

8. The system of claim 1, wherein said optical phase detector is selected from a group consisting of a Fabry-Pérot interferometer, Mach-Zehnder interferometer, Michelson-Morley interferometer, a spatial-mode interferometer, and a combination thereof.

9. The system of claim 1, wherein said mechanical drive is selected from a group consisting of a piezoelectric drive, optical radiation pressure drive, photothermal drive, photoacoustic drive, electrostatic drive, magnetic drive, thermal expansion drive, and a combination thereof.

10. The system of claim 1, wherein said computer system is further configured to compute the mechanical ring-down time of said vibration mode excited in said membrane member responsive to the application of the force from said mechanical drive to said membrane member, as a time between detection of an initial amplitude of said vibration mode and detection of an amplitude reduced to approximately 1/e of the initial amplitude, wherein e is approximately 2.718281828459046.

11. The system of claim 1, wherein said computer system is further configured to compute the pressure in said vacuum chamber in accordance with $$\frac{1}{\tau_{rd}} = \Gamma_{tot} = \Gamma_i + \sqrt{\frac{32}{\pi}\frac{m_m}{k_B T}}\frac{1}{\rho h}p$$

where $\tau_{rd}$ is a ring-down time of said vibration mode in the membrane member, $m_m$ is the molecular mass of a gas in said vacuum chamber at pressure p, $\rho$ is the density of the membrane member material, h is the membrane member thickness, T is the temperature, $\Gamma_i$ is the intrinsic mechanical decay rate of the membrane member, and $k_B$ is the Boltzmann constant.

12. The system of claim 1, measuring the pressure in the vacuum chamber ranging between $10^{-6}$ Pa to $10^{-2}$ Pa.

13. A method for high vacuum pressure measurements using vibrational modes of a membrane, comprising:
    (a) establishing a pressure sensor system by mounting an ultra-thin membrane member in a vacuum chamber on a vibration-isolated mounting structure, coupling a mechanical drive to said membrane member, impinging a light beam generated by a light source to said membrane member, and operatively coupling an optical phase detector with said membrane member to detect a light beam transmitted therethrough or reflected therefrom;

(b) applying a drive force by said mechanical drive to said membrane member sufficient to excite a vibration mode in said membrane member having a magnitude exceeding ambient thermal modulations of said membrane member;

(c) detecting, by said optical phase detector, at least one property of the vibration mode excited in said membrane member, said at least one property being selected from a group consisting of an amplitude of said vibration mode, a resonant frequency shift, a phase shift, and an angular deviation of the light beam transmitted through, or reflected from, said membrane member caused by said vibration mode excited in said membrane member;

(d) measuring a mechanical damping characteristic of said vibration mode based on said detected amplitude; and (e) computing, by a computer, the pressure based on a combination of said mechanical damping characteristic, the thickness of said membrane member, a molecular mass of a gas in said vacuum chamber, a density of the membrane member material, a temperature, an intrinsic mechanical decay rate of the membrane member, and the Boltzmann constant.

14. The method of claim 13, further comprising the step of:
configuring said vibration-isolated mounting structure as a phononic bandgap structures, a wire, a cantilever, a spring suspension, or a combination thereof.

15. The method of claim 13, further comprises the step of:
configuring said light source as a single-frequency diode laser, a fiber laser, a fiber-coupled light-emitting diode, or a combination thereof.

16. The method of claim 13, further comprising the step of:
configuring said optical phase detector as a Fabry-Pérot interferometer, a Mach-Zehnder interferometer, a Michelson-Morley interferometer, a spatial-mode interferometer, or a combination thereof.

17. The method of claim 13, further comprising the step of:
configuring said mechanical drive as a piezoelectric drive, optical radiation pressure drive, photothermal drive, photoacoustic drive, electrostatic drive, magnetic drive, thermal expansion drive, or a combination thereof.

18. The method of claim 13, further comprising the step of:
in said step (c), computing the amplitude based on said phase shift.

19. The method of claim 13, further comprising the steps of:
in said step (c), measuring said angular deviation of the light beam reflected from said membrane member from the incident light beam, and in said step (e), computing the pressure based on said angular deviation.

20. The method of claim 13, further comprising the step of:
in said step (e), computing the pressure in said vacuum chamber in accordance with $$\frac{1}{\tau_{rd}} = \Gamma_{tot} = \Gamma_i + \sqrt{\frac{32}{\pi} \frac{m_m}{k_B T}} \frac{1}{\rho h} p$$

where $\tau_{rd}$ is a ring-down time of said vibration mode, $m_m$ is the molecular mass of a gas in the vacuum chamber at pressure p, $\rho$ is the density of the membrane member material, h is the membrane member thickness, T is the temperature, $\Gamma_i$ is the intrinsic mechanical decay rate of the membrane member, and $k_B$ is the Boltzmann constant.

* * * * *